(12) United States Patent
Fink et al.

(10) Patent No.: US 10,691,958 B1
(45) Date of Patent: Jun. 23, 2020

(54) PER-LANE TRAFFIC DATA COLLECTION AND/OR NAVIGATION

(71) Applicant: Ambarella International LP, Santa Clara, CA (US)

(72) Inventors: Alexander Fink, San Jose, CA (US); Shimon Pertsel, Mountain View, CA (US)

(73) Assignee: Ambarella International LP, Santa Clara, CA (US)

( * ) Notice: Subject to any disclaimer, the term of this patent is extended or adjusted under 35 U.S.C. 154(b) by 92 days.

(21) Appl. No.: 14/813,938

(22) Filed: Jul. 30, 2015

(51) Int. Cl.
| | | |
|---|---|---|
| G06K 9/00 | (2006.01) | |
| B60R 1/00 | (2006.01) | |
| G01S 19/13 | (2010.01) | |
| G06K 9/62 | (2006.01) | |

(52) U.S. Cl.
CPC ............ G06K 9/00791 (2013.01); B60R 1/00 (2013.01); G01S 19/13 (2013.01); G06K 9/00798 (2013.01); G06K 9/00805 (2013.01); G06K 9/00818 (2013.01); G06K 9/00825 (2013.01); G06K 9/6267 (2013.01); B60R 2300/804 (2013.01)

(58) Field of Classification Search
None
See application file for complete search history.

(56) References Cited

U.S. PATENT DOCUMENTS

| | | | | |
|---|---|---|---|---|
| 6,385,539 | B1* | 5/2002 | Wilson | G01C 21/30 340/905 |
| 8,471,691 | B2* | 6/2013 | Zhang | B60K 35/00 340/425.5 |
| 8,730,260 | B2* | 5/2014 | Funabashi | G08G 1/096716 345/619 |
| 9,150,220 | B2* | 10/2015 | Clarke | B60W 30/00 |
| 9,224,293 | B2* | 12/2015 | Taylor | G08G 1/08 |
| 9,487,139 | B1* | 11/2016 | Ishida | B60W 50/14 |
| 2002/0049534 | A1* | 4/2002 | Yuda | G01C 21/365 701/533 |
| 2002/0193938 | A1* | 12/2002 | DeKock | G08G 1/0104 701/117 |
| 2005/0232469 | A1* | 10/2005 | Schofield | G06K 9/00818 382/104 |

(Continued)

FOREIGN PATENT DOCUMENTS

JP    2010237003 A   * 10/2010

OTHER PUBLICATIONS

Fink, Alexander, U.S. Appl. No. 14/179,715, filed Feb. 13, 2014, "Vehicle Video Camera/Recorder Initiated Emergency Calling", 42 pages.

*Primary Examiner* — Jayanti K Patel
*Assistant Examiner* — Stefan Gadomski
(74) *Attorney, Agent, or Firm* — Christopher P. Maiorana, PC

(57) ABSTRACT

An apparatus comprising a sensor, an interface and a processor. The sensor may be configured to generate a video signal based on a targeted view from a vehicle. The interface may receive status information from the vehicle. The processor may be configured to detect objects in the video signal. The processor may be configured to generate metadata in response to (i) a classification of the objects in the video signal and (ii) the status information. The metadata may be used to report road conditions.

20 Claims, 11 Drawing Sheets

(56) References Cited

U.S. PATENT DOCUMENTS

| | | | |
|---|---|---|---|
| 2007/0208504 A1* | 9/2007 | Lee | G01C 21/26 701/532 |
| 2010/0098295 A1* | 4/2010 | Zhang | G06K 9/00798 382/103 |
| 2010/0098297 A1* | 4/2010 | Zhang | B60W 30/09 382/104 |
| 2010/0104199 A1* | 4/2010 | Zhang | G06K 9/00798 382/199 |
| 2010/0253540 A1* | 10/2010 | Seder | B60R 1/00 340/905 |
| 2010/0253543 A1* | 10/2010 | Szczerba | B60Q 9/005 340/932.2 |
| 2010/0253597 A1* | 10/2010 | Seder | B60R 1/00 345/7 |
| 2010/0253598 A1* | 10/2010 | Szczerba | G01S 13/723 345/7 |
| 2010/0253602 A1* | 10/2010 | Szczerba | G01S 13/723 345/8 |
| 2010/0289632 A1* | 11/2010 | Seder | G01S 13/723 340/436 |
| 2011/0222732 A1* | 9/2011 | Higuchi | B60W 40/076 382/104 |
| 2012/0163671 A1* | 6/2012 | Choi | G06K 9/00805 382/104 |
| 2012/0194681 A1* | 8/2012 | Atsmon | G01C 21/3602 348/149 |
| 2013/0028473 A1* | 1/2013 | Hilldore | G06K 9/00798 382/103 |
| 2013/0116859 A1* | 5/2013 | Ihlenburg | G06F 17/00 701/2 |
| 2013/0166194 A1* | 6/2013 | Delahaye | G01C 21/367 701/410 |
| 2013/0226409 A1* | 8/2013 | Akiyama | B60W 10/184 701/41 |
| 2013/0274959 A1* | 10/2013 | Igarashi | G08G 1/096844 701/1 |
| 2013/0321172 A1* | 12/2013 | Igarashi | G08G 1/166 340/905 |
| 2014/0111647 A1* | 4/2014 | Atsmon | H04N 7/185 348/148 |
| 2014/0266655 A1* | 9/2014 | Palan | G06K 9/00805 340/435 |
| 2014/0278052 A1* | 9/2014 | Slavin | G01C 21/3492 701/400 |
| 2015/0098621 A1* | 4/2015 | Bernal | G06T 7/0022 382/104 |
| 2015/0117715 A1* | 4/2015 | Murao | G06K 9/00825 382/104 |
| 2015/0145996 A1* | 5/2015 | Watanabe | G08G 1/09626 348/148 |
| 2015/0151725 A1* | 6/2015 | Clarke | B60W 30/00 701/28 |
| 2015/0178572 A1* | 6/2015 | Omer | G08G 1/0112 382/108 |
| 2015/0178578 A1* | 6/2015 | Hampiholi | G08G 1/166 348/149 |
| 2015/0194055 A1* | 7/2015 | Maass | B60W 50/14 340/905 |
| 2015/0202939 A1* | 7/2015 | Stettner | B60R 21/0134 701/37 |
| 2015/0278615 A1* | 10/2015 | Ogawa | G06K 9/00818 348/148 |
| 2015/0312327 A1* | 10/2015 | Fowe | G01C 21/26 701/23 |
| 2015/0321605 A1* | 11/2015 | Mirza | B60R 1/00 348/148 |
| 2015/0344034 A1* | 12/2015 | Niino | B60W 30/16 701/96 |
| 2015/0371095 A1* | 12/2015 | Hartmann | G06K 9/00791 348/148 |
| 2016/0046237 A1* | 2/2016 | Sugimoto | B60R 1/00 348/148 |
| 2016/0063858 A1* | 3/2016 | Schmudderich | B60W 40/04 701/117 |
| 2016/0101778 A1* | 4/2016 | Hasberg | B60W 30/18154 701/96 |
| 2016/0117562 A1* | 4/2016 | Chung | G06K 9/00818 382/104 |
| 2016/0138924 A1* | 5/2016 | An | G01C 21/34 701/25 |
| 2016/0148513 A1* | 5/2016 | Beaurepaire | G08G 1/164 701/117 |
| 2016/0203375 A1* | 7/2016 | Nitschke | B60W 30/12 701/70 |
| 2016/0321924 A1* | 11/2016 | Lewis | G08G 1/096791 |
| 2016/0341561 A1* | 11/2016 | Woolley | G01C 21/3658 |
| 2016/0341564 A1* | 11/2016 | Cheng | G01C 21/3641 |
| 2016/0357187 A1* | 12/2016 | Ansari | G01S 13/89 |
| 2016/0357188 A1* | 12/2016 | Ansari | G05D 1/0212 |
| 2016/0357262 A1* | 12/2016 | Ansari | G06F 3/017 |
| 2016/0358477 A1* | 12/2016 | Ansari | G08G 1/167 |
| 2017/0008521 A1* | 1/2017 | Braunstein | G08G 1/0112 |
| 2017/0016740 A1* | 1/2017 | Cui | G01C 21/3658 |
| 2017/0021833 A1* | 1/2017 | Abdel-Rahman | B60W 30/165 |
| 2017/0076598 A1* | 3/2017 | Scofield | G08G 1/0112 |
| 2017/0082452 A1* | 3/2017 | Sumizawa | B60W 30/10 |
| 2018/0024562 A1* | 1/2018 | Bellaiche | G01S 19/48 701/26 |
| 2018/0025235 A1* | 1/2018 | Fridman | G01C 21/28 382/103 |
| 2019/0236941 A1* | 8/2019 | Lindsay | B60Q 1/0023 |
| 2020/0020165 A1* | 1/2020 | Tran | G06T 19/006 |
| 2020/0064843 A1* | 2/2020 | Shashua | G01C 21/3476 |
| 2020/0064844 A1* | 2/2020 | Shashua | G05D 1/0251 |
| 2020/0073388 A1* | 3/2020 | Shashua | G05D 1/0287 |

\* cited by examiner

PER-LANE TRAFFIC DATA COLLECTION AND/OR NAVIGATION

FIELD OF THE INVENTION

The present invention relates to video capture devices generally and, more particularly, to a video capture device to generate traffic data on a per-lane basis that may be used to assist navigation applications.

BACKGROUND OF THE INVENTION

Conventional real-time traffic information is collected on a per-road basis. Such per-road traffic information carries the same information, such as speed, for all lanes on the road. However, most roads do not have lanes with traffic traveling at the same speed. High occupancy vehicle (FEW) lanes usually travel faster than other lanes. Exit lanes or merge lanes usually travel slower than other lanes. A lane can be closed due to an accident. An exit ramp (or an on-ramp) can be closed due to roadwork. Current real-time traffic maps and navigation apps/devices do not reflect traffic on a per-lane basis.

It would be desirable to implement a video capture device to generate traffic information on a per-lane basis.

SUMMARY OF THE INVENTION

The present invention concerns an apparatus comprising a sensor, an interface and a processor. The sensor may be configured to generate a video signal based on a targeted view from a vehicle. The interface may receive status information from the vehicle. The processor may be configured to detect objects in the video signal. The processor may be configured to generate metadata in response to (i) a classification of the objects in the video signal and (ii) the status information. The metadata may be used to report road conditions.

The objects, features and advantages of the present invention include providing a video capture device that may (i) provide traffic data on a per-lane basis, (ii) be used to help navigation, (iii) be used by a navigation application to provide lane suggestions, (iv) provide per-lane data to a server to be aggregated with other lane information from other devices and/or (v) be easy to implement.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

An example embodiment may comprise a video capture device that may generate traffic data on a per-lane basis. The device may be used to assist navigation in real-time traffic maps and/or navigation apps/devices. The traffic data may reflect per-lane traffic flow to show details such as travel speeds (and estimated travel times) on a per-lane granularity. The device may potentially recommend routes with lane information taken into account. The capture device may be implemented along with other video features to reduce a cost of implementation.

Figure 1:
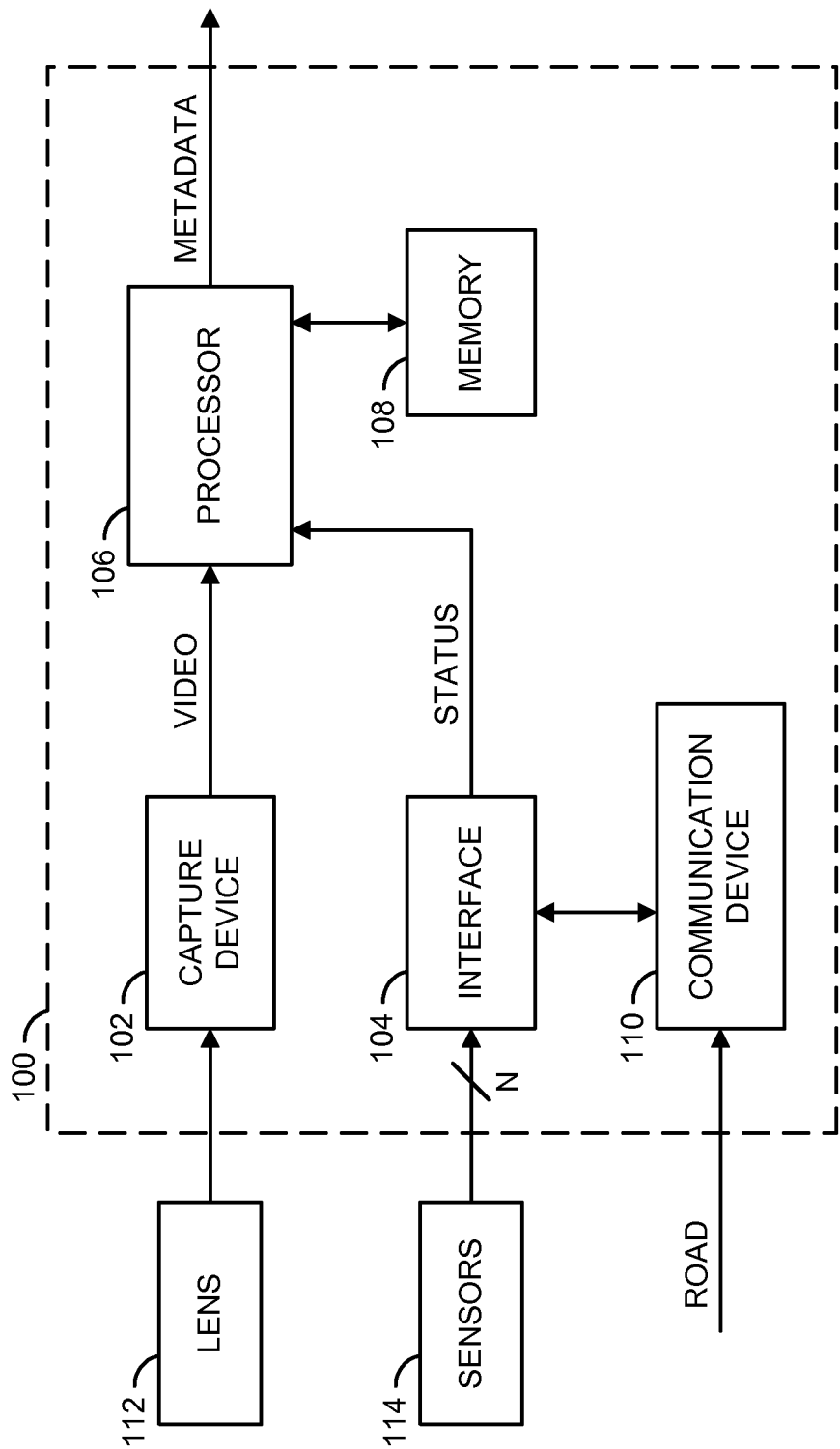
FIG. 1 is a block diagram of an example embodiment of an apparatus.

Referring to FIG. 1, a block diagram of an apparatus 100 is shown in accordance with an embodiment of the present invention. The apparatus 100 may be a camera device. For example, the apparatus 100 may be implemented as part of a camera device (or system) in a vehicle such as an automobile, truck and/or motorcycle. The camera device 100 may comprise a block (or circuit) 102, a block (or circuit) 104, a block (or circuit) 106, a block (or circuit) 108 and/or a block (or circuit) 110. The circuit 102 may be implemented as capture device. The circuit 104 may be implemented as an interface. The circuit 106 may be implemented as a processor. The circuit 108 may be implemented as a memory. The circuit 110 may be implemented as a communication device. In one example, the circuit 110 may be implemented as an external communication device. The circuit 110 may receive an input (e.g., ROAD). The input ROAD may comprise information about a road traveled by a vehicle having the apparatus 100 (e.g., road conditions).

The apparatus 100 may be connected to a block 112 and a block (or circuit) 114. The block 112 may be implemented as a lens (e.g., a camera lens). The block 114 may be implemented as one or more sensors (e.g., a location module such as a global positioning system (GPS) sensor and/or an orientation module such as a magnetometer). Generally, the sensors 114 may be input/output devices implemented separately from the capture device 102. In some embodiments, the communication device 110 and/or the sensors 114 may be implemented as part of the apparatus 100 (e.g., internal components of the camera device 100).

The camera device 100 is shown receiving input from the lens 112. In some embodiments, the lens 112 may be implemented as part of the camera device 100. The components implemented in the camera device 100 may be varied according to the design criteria of a particular implementation. In some embodiments, the camera device 100 may be implemented as a drop-in solution (e.g., installed as one component).

The capture device 102 may present a signal (e.g., VIDEO) to the processor 106. The interface 104 may present a signal (e.g., STATUS) to the processor 106. The interface 104 may receive data from the sensors 114. The processor 106 may be configured to receive the signal VIDEO, the signal STATUS and/or other signals. The processor 106 may be configured to generate a signal (e.g., METADATA). The inputs, outputs and/or arrangement of the components of the camera device 100 may be varied according to the design criteria of a particular implementation.

The camera device 100 may be implemented as a regular digital camera and/or a depth-sensing camera. The sensors 114 may comprise a GPS and/or a magnetometer. The sensors 114 may be implemented on-board the camera device 100 and/or connected externally (e.g., via the interface 104). The processor 106 may analyze the captured video content (e.g., the signal VIDEO) in real time to detect objects 260a-260n (to be described in more detail in association with FIG. 5).

Figure 2:
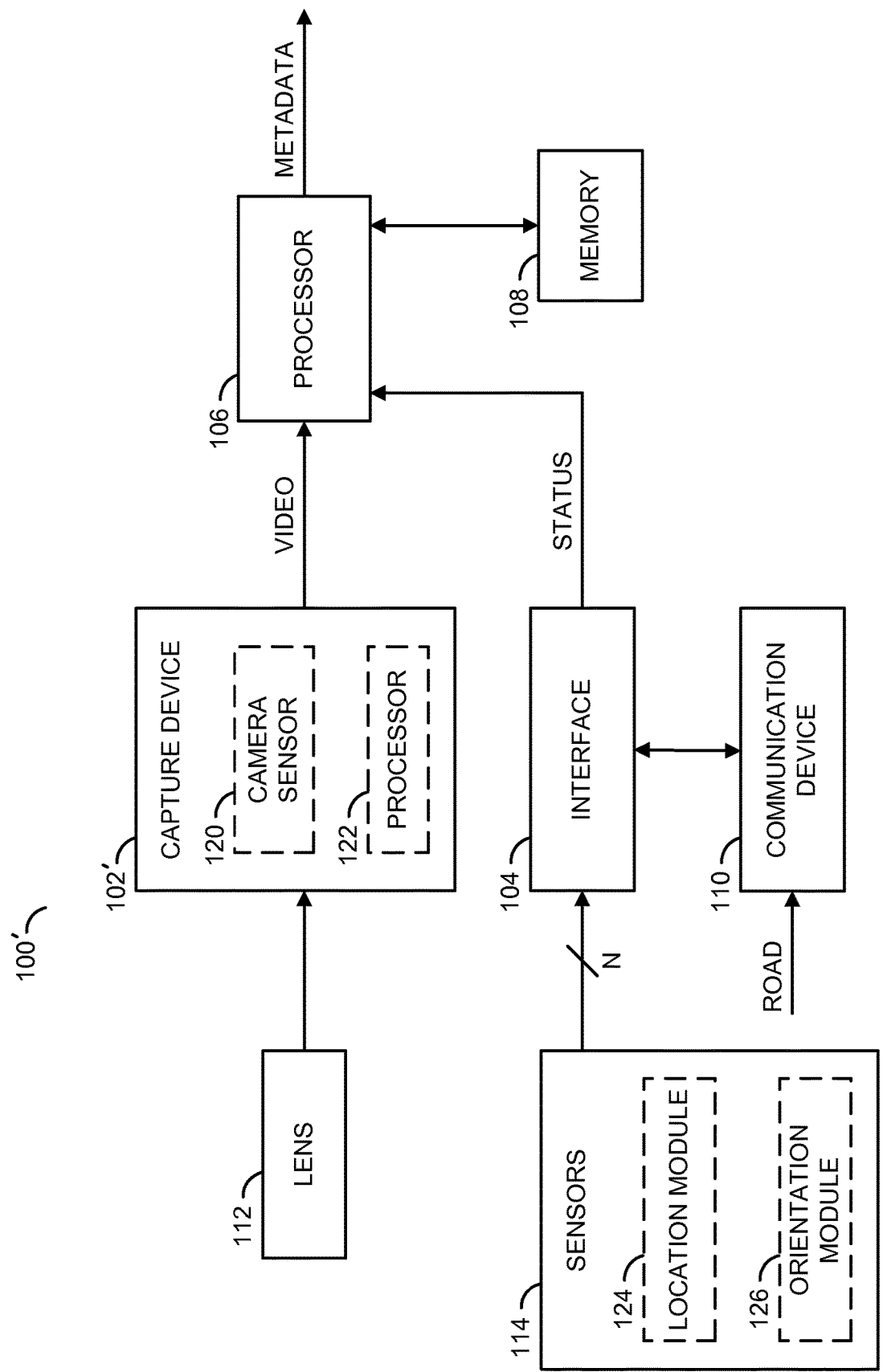
FIG. 2 is a block diagram of another example embodiment of an apparatus.

Referring to FIG. 2, a block diagram of the apparatus 100' is shown in accordance with an embodiment of the present invention. The camera device 100' may comprise the capture device 102', the interface 104, the processor 106, the memory 108, the communication device 110, the lens 112 and/or the sensors 114. The camera device 100' may be a distributed system (e.g., each component may be implemented separately throughout an installation location such as a vehicle). The capture device 102' may comprise a block (or circuit) 120 and/or a block (or circuit) 122. The circuit 120 may be a camera sensor (e.g., a camera sensor separate from the sensors 114). The circuit 122 may be a processor (e.g., a processor separate from the processor 106). The capture device 102' may implement a separate internal memory (e.g., a memory separate from the memory 108). The sensors 114 may comprise a block (or circuit) 124 and/or a block (or circuit) 126. The circuit 124 may be a location module. In one example, the location module 124 may be configured as a GPS component. The circuit 126 may be an orientation module. In one example, the orientation module 126 may be configured as a magnetometer component. Other types of sensors may be implemented as components of the sensors 114.

Figure 3:
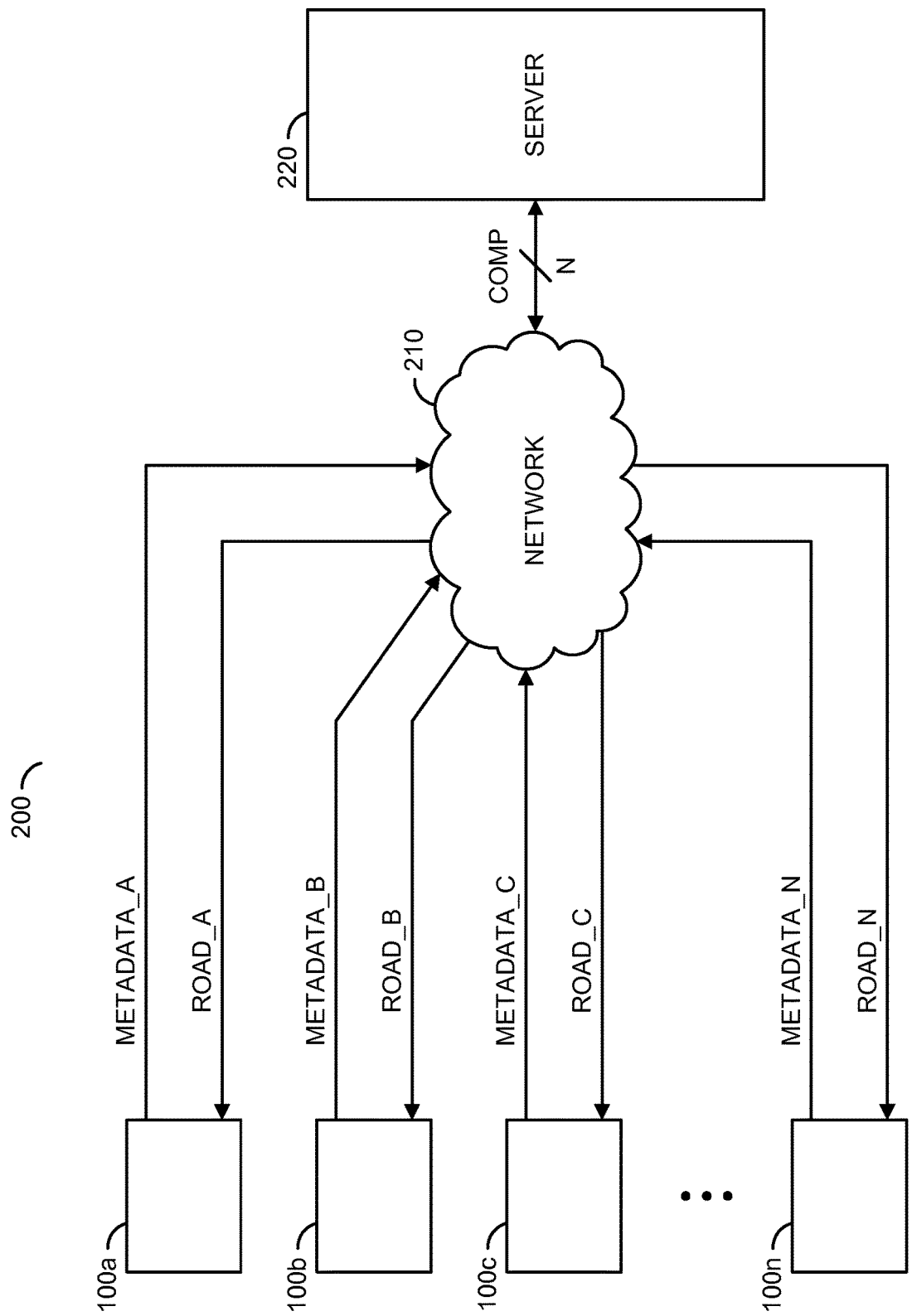
FIG. 3 is a block diagram of multiple devices sending and receiving information from a server.

Referring to FIG. 3, a block diagram of an implementation of a system 200 is shown. The system 200 may comprise a number of the apparatus 100a-100n, a network 210 and a server 220. The apparatus 100a is shown sending a signal METADATA_A to the network 210. The apparatus 100a is shown receiving a signal ROAD_A from the network 210. In general, the apparatus 100a generates the signal METADATA_A to be sent to the network 210, and receives the signal ROAD_A from the network 210. The apparatus 100b-100n have similar connections. The network 210 may be configured to send a signal (e.g., COMP) to the server 220. The signal COMP may be a composite signal that is fed and/or received to/from the server 220.

The signal COMP may be a variable bit signal and/or may represent a number of signals from the various devices 100a-100n. For example, the signal COMP may be generated based on a calculated road throughput and/or calculated road conditions. The network 210 may be implemented as a Wi-Fi network, a 3G cellular network, a 4G LTE cellular network, or other type of network that would allow the number of the local devices 100a-100n to connect to the network 210. The server 220 may utilize the network 210 to receive the signals METADATA_A-METADATA_N, aggregate the metadata, calculate the road conditions and/or present suggestions and lane-specific information to the apparatus 100 (e.g., ROAD_A-ROAD_N).

Figure 4:
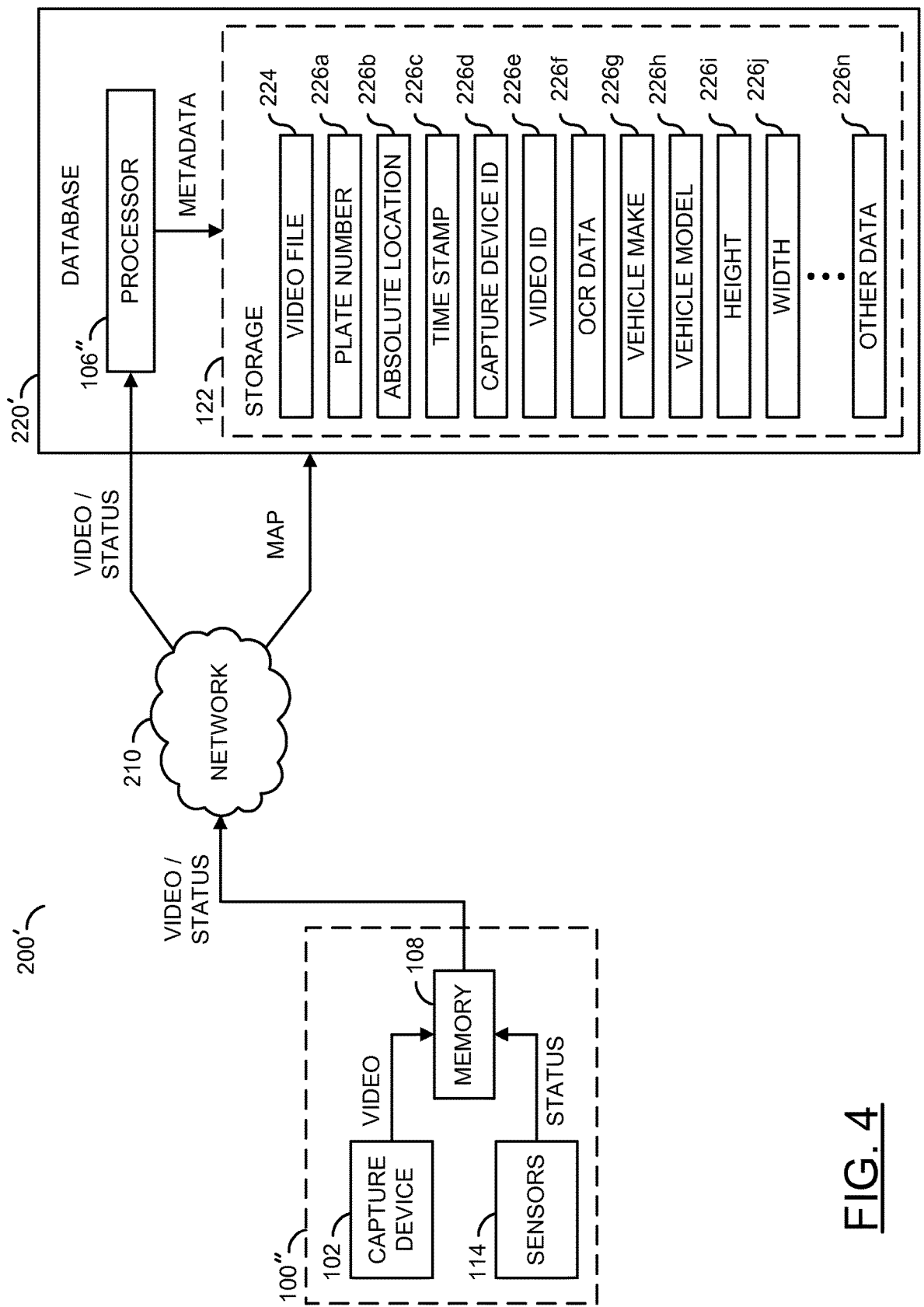
FIG. 4 is a block diagram of an example embodiment of a database server configured to generate metadata from the video signal.

Referring to FIG. 4, a block diagram of an example embodiment 200' of the server 220' configured to generate metadata from the video signal is shown. The embodiment 200' shows the camera device 100", the network 210 and the server 220'. The network 210 may be a local network and/or a wide area network (e.g., the Internet). Other components may be implemented as part of the embodiment 200' according to the design criteria of a particular implementation. For example, other servers and/or server farms may provide information to the network 210.

The camera system 100" is shown configured to present the signals VIDEO and/or STATUS to the network 210. For example, the signals may be transmitted via USE, Ethernet, Wi-Fi, Bluetooth, etc. The capture device 102 is shown presenting the signal VIDEO to the memory 108. The sensors 114 are shown presenting the signal STATUS to the memory 108. The memory 108 may store and/or combine the signals VIDEO and/or STATUS. In some embodiments, the signals VIDEO and/or STATUS may be combined by the processor 122 (e.g., a local processor of the camera device 100"). In some embodiments, a connection and/or an interface of the camera device 100 may be implemented to transmit the signals VIDEO and/or STATUS to the network 210 (e.g., the communication device 110).

In some embodiments, the camera device 100 may store the status information (e.g., the signal STATUS) received from the sensors 114 (or the interface 104) in the memory 108 along with the video file (e.g., the signal VIDEO). The status information may be saved as a text track in the video file. The video file may be uploaded to the server 220' via the network 210.

In some embodiments, the camera device 100 may live stream the signal VIDEO and the status information to the database server 220' via the network 210. For example, the live streamed data may be communicated via hard-wired communication (e.g., Ethernet), Wi-Fi communication and/or cellular communication. The method of transmitting the signals VIDEO and/or STATUS may be varied according to the design criteria of a particular implementation.

The network 210 is shown receiving the signals VIDEO and/or STATUS from the camera device 100". The network 210 is shown presenting the signals VIDEO and/or STATUS to the database server 220'. The network 210 is shown presenting a signal (e.g., MAP) to the server 220'. The signal MAP may be map information received from other sources (e.g., data collected from map providers such as Google, Garmin, Bing, Apple, etc.). For example, the signal MAP may be static map information.

The database 220' may comprise the processor 106" and/or a block (or circuit) 122. The circuit 122 may be configured as storage. The storage 122 may be implemented as a magnetic storage medium (e.g., storage tape, hard disk drives, etc.), optical media and/or flash storage. The type of the storage 122 may be varied according to the design criteria of a particular implementation. The storage 122 may be searchable. The storage 122 is shown storing various types of data 224 and 226a-226n. The data 224 may be a video file (e.g., the signal VIDEO). The data 226a-226n may be metadata information. The metadata information 226a-226n may be lane-specific information.

The processor 106" may be implemented as part of the database server 220'. The processor 106" may analyze the signal VIDEO and/or the signal STATUS (e.g., the status information) on the database server 220' in order to generate the signal METADATA. The signal METADATA and/or the signal VIDEO may be stored in the storage 122. The processed video may be stored as the video file 224 along with the corresponding metadata 226a-226n. The processor 106" may be configured to overlay lane-specific information generated in response to the metadata (e.g., the road conditions) based on map information received from external sources (e.g., the signal MAP). For example, the road conditions may comprise an average speed of traffic in each lane, lane closures, exit ramp closures, empty lanes, traffic accidents, on-ramp closures, per lane occupancy and/or high occupancy vehicle lanes.

The metadata information 226a-226n may be electronically stored data. The metadata information 226a-226n may be stored as alphanumeric characters and/or other data types (e.g., plain-text, binary data, hexadecimal numbers, etc.). The metadata information 226a-226n may be stored in data fields. The context of the metadata information 226a-226n may be based on the associated data field.

Figure 5:
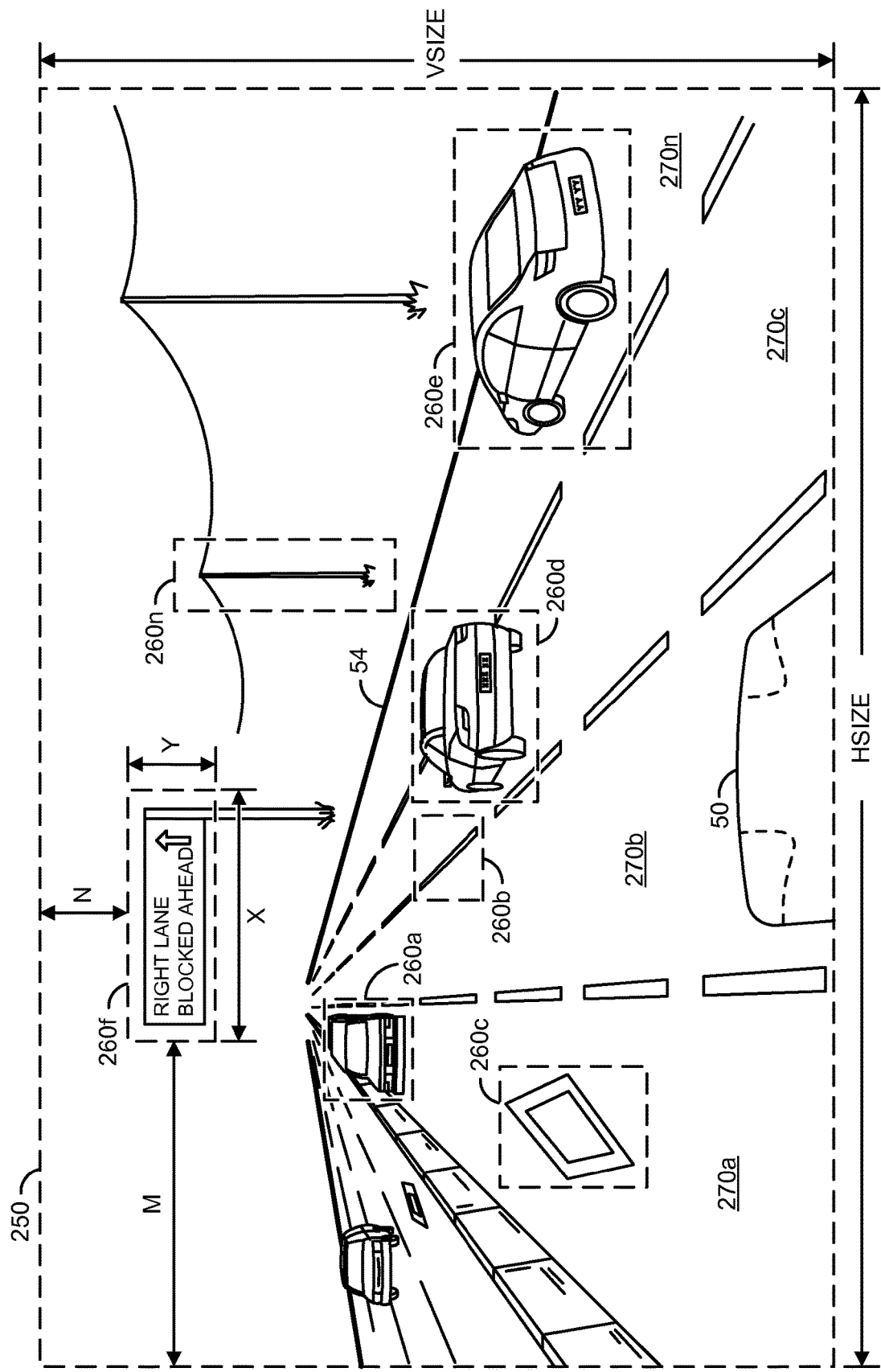
FIG. 5 is a diagram illustrating objects being detected in a video frame.
Figure 6:
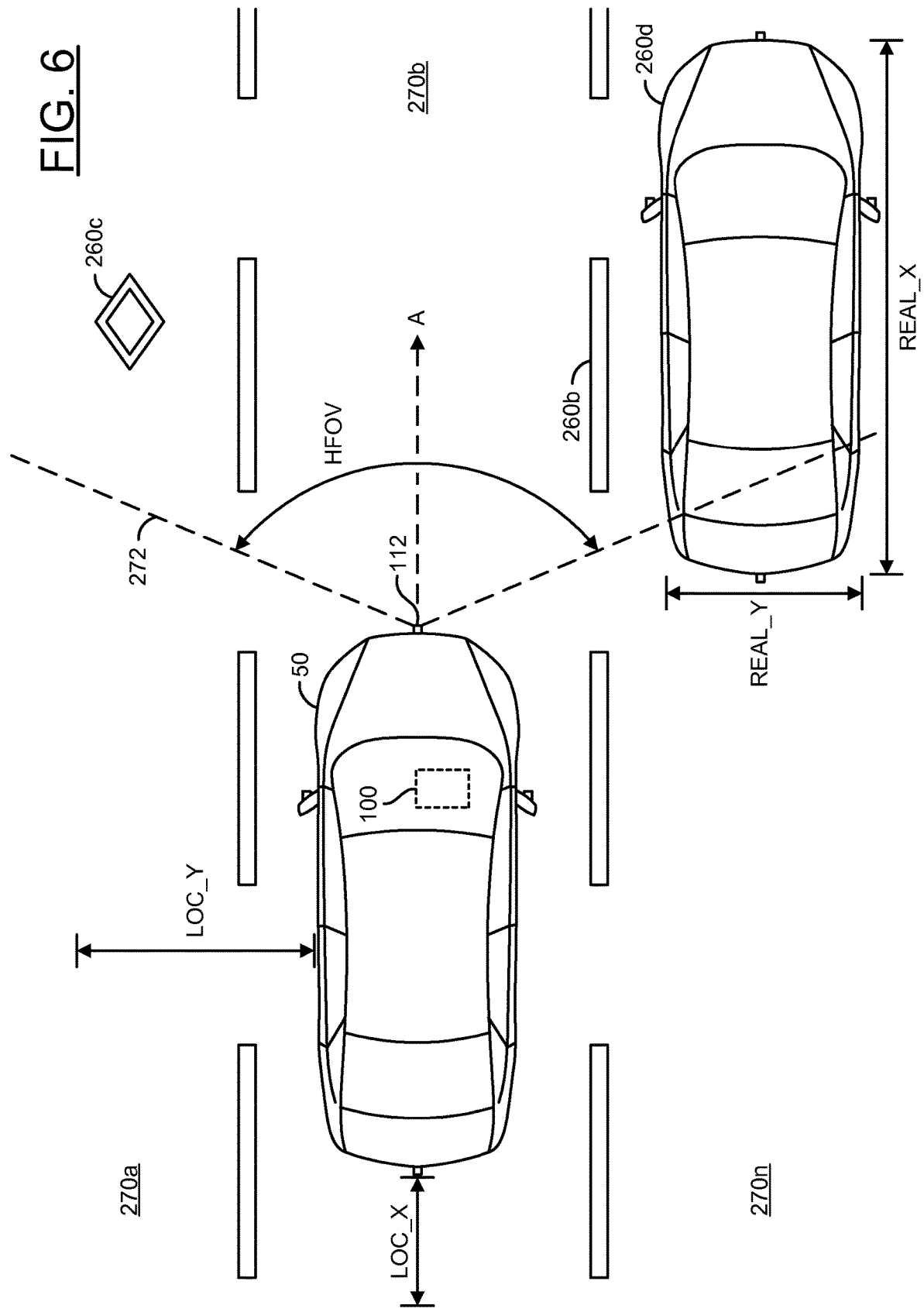
FIG. 6 is a diagram illustrating objects in a field of view of the apparatus.

Generally, the metadata information 226a-226n may comprise contextual information, comprise processing information and/or use information that may assist with identification (or classification) of objects in a video frame (to be described in more detail in association with FIGS. 5-6). The metadata information 226a-226n generally comprises information related to one or more objects detected in a video frame, information related to the targeted view of the environment (e.g., a view from a vehicle) and/or information related to the camera device 100 (e.g., camera specification, camera features, zoom settings, color settings, exposure settings, aperture settings, ISO settings, shutter speed settings, etc.).

The metadata information 226a-226n may comprise a license plate number, an absolute location (or coordinates) of the camera device 100, an absolute location (or coordinates) of detected objects, a timestamp corresponding to when the video/image was recorded, an ID of the camera device 100, a video file ID, optical character recognition (OCR) data, vehicle make, vehicle model, height of an object, width of an object and/or other data. The metadata information 226a-226n may be uploaded and/or stored in the searchable database 220'. For example, the metadata information 226a-226n may be uploaded via hard-wired communication, Wi-Fi communication and/or cellular communication. The type of communication may be varied according to the design criteria of a particular implementation.

The metadata information 226a-226n may allow the lane-specific information to be overlaid on existing map data by the processor 106". The processor 106" may be configured to aggregate the metadata from the apparatus 100a-100n, determine lane-specific information and/or provide route recommendations to drivers. For example, a route recommendation may provide a driver and/or an autonomous vehicle alternate paths and/or lanes based on information about roads (e.g., road conditions) on a lane-specific granularity. The lane-specific information may be varied according to the design criteria of a particular implementation.

Referring to FIG. 5, a diagram illustrating a video frame 250 is shown. The frame 250 may be one of a number of frames of the signal VIDEO captured by the capture device 102. The frame 250 is shown having a number of objects 260a-260n. A number of lanes 270a-270n are shown. The lens 112 may capture the frame 250. The lens 112 may be in a vehicle 50 that may be moving in a lane 270b. The video frame 250 is shown as a perspective of a driver (e.g., a targeted view from the vehicle 50).

The objects 260a-260n represent objects that may be detected and/or classified within the frame 250. For example, the object 260a may represent an automobile in the lane 270a. The object 260b may represent the marker (e.g., a lane divider) between the lane 270b and the lane 270c. The object 260c may represent a lane marker in the lane 270a (e.g., a high-occupancy vehicle (HOV) lane marker). The object 260d may represent an automobile traveling in the lane 270c. The object 260e may represent a car traveling in the lane 270n. The object 260f may represent a sign for a road 54. For example, the camera device 100 may be configured to perform optical character recognition (OCR) on the text of the sign 260f. The object 260n may represent a utility pole outside of all of the lanes 270a-270n. Other types of objects may comprise pylons, road cones, barriers, etc. The number and/or types of objects 260a-260n detected may be varied according to the design criteria of a particular implementation.

The processor 106 may be configured to determine the location of an object in the frame 250. For example, a horizontal distance M is shown from a left edge of the frame 250 to the object 260f and a vertical distance N is shown from a top edge of the frame 250 to the object 260f. Other distances and/or dimensions may be calculated to determine the location of the object in the frame (e.g., a distance from each edge of the object to the edge of the frame 250). The location of the object in the frame 250 may be calculated to determine the absolute coordinates of the objects 260a-260n.

The processor 106 may be configured to determine a size of the detected objects 260a-260n in a frame. For example, the detected object 260f is shown having a dimension X (e.g., a horizontal measurement in pixels) and a dimension Y (e.g., a vertical measurement in pixels). The type of unit of measurement for the dimensions X and/or Y of the detected objects 260a-260n may be varied according to the design criteria of a particular implementation. The size of the detected objects 260a-260n in the video frame 250 may be used to determine the absolute coordinates of the objects 260a-260n, to classify a type of the detected objects 260a-260n (e.g., vehicles, lane markers, road signs, etc.) and/or a condition of the detected objects 260a-260n (e.g., slow-moving, damaged, closed, etc.).

The processor 106 may be configured to determine a vertical size (e.g., VSIZE) and/or a horizontal size (e.g., HSIZE) of the video frame 250. For example, the sizes VSIZE and/or HSIZE may be a measurement of a number of pixels (e.g., a resolution) of the video frame 250. The type of unit of measurement for the video frame may be varied according to the design criteria of a particular implementation. The size of the video frame 250 may be used to determine the absolute coordinates of the objects 260a-260n.

The capture device 102 may be configured to capture video image data (e.g., from the lens 112). In some embodiments, the capture device 102 may be a video capturing device such as a camera. In some embodiments, the capture device 102 may be a component of a camera (e.g., a camera pre-installed at a fixed location such as a dashboard camera). The capture device 102 may capture data received through the lens 112 to generate a bitstream (e.g., generate video frames). For example, the capture device 102 may receive light from the lens 112. The lens 112 may be directed, panned, zoomed and/or rotated to provide a targeted view from the vehicle 50.

The capture device 102 may transform the received light into digital data (e.g., a bitstream). In some embodiments, the capture device 102 may perform an analog to digital conversion. For example, the capture device 102 may perform a photoelectric conversion of the light received by the lens 112. The capture device 102 may transform the bitstream into video data, a video file and/or video frames (e.g., perform encoding). For example, the video data may be a digital video signal. The digital video signal may comprise video frames (e.g., sequential digital images).

The video data of the targeted view from the vehicle 50 may be represented as the signal/bitstream/data VIDEO (e.g., a digital video signal). The capture device 102 may present the signal VIDEO to the processor 106, The signal VIDEO may represent the video frames/video data (e.g., the video frame 250). The signal VIDEO may be a video stream captured by the capture device 102. In some embodiments, the capture device 102 may be implemented in the camera. In some embodiments, the capture device 102 may be configured to add to existing functionality of the camera.

In some embodiments, the capture device 102 may be pre-installed at a pre-determined location (e.g., a dashboard camera on the vehicle 50) and the camera device 100 may connect to the capture device 102. In other embodiments, the capture device 102 may be part of the camera device 100. The capture device 102 may be configured for traffic monitoring. For example, the capture device 102 may be implemented to detect road signs, vehicles and/or collisions at a lane-specific granularity (e.g., classify objects based on categories and/or reference objects). The capture device 102 may be configured to perform OCR (e.g., read road signs and/or notifications). The camera device 100 may be configured to leverage pre-existing functionality of the pre-installed capture device 102. The implementation of the capture device 102 may be varied according to the design criteria of a particular implementation.

In some embodiments, the capture device 102' may implement the camera sensor 120 and/or the processor 122. The camera sensor 120 may receive light from the lens 112 and transform the light into digital data (e.g., the bitstream). For example, the camera sensor 120 may perform a photoelectric conversion of the light from the lens 112. The processor 122 may transform the bitstream into a human-legible content (e.g., video data). For example, the processor 122 may receive pure (e.g., raw) data from the camera sensor 120 and generate (e.g., encode) video data based on the raw data (e.g., the bitstream). The capture device 102' may have a memory to store the raw data and/or the processed bitstream. For example, the capture device 102' may implement a frame memory and/or buffer to store (e.g., provide temporary storage and/or cache) one or more of the video frames (e.g., the digital video signal). The processor 122 may perform analysis on the video frames stored in the memory/buffer of the capture device 102'.

In some embodiments the capture device 102' may be configured to determine a location of the detected objects 260a-260n. For example, the processor 122 may analyze the captured bitstream (e.g., using machine vision processing), determine a location of the detected objects 260a-260n and present the signal VIDEO (e.g., comprising information about the location of the detected objects 260a-260n) to the processor 106. The processor 122 may be configured to determine the location of the detected objects 260a-260n (e.g., less analysis is performed by the processor 106). In another example, the processor 122 may generate the signal VIDEO comprising video frames and the processor 106 may analyze the video frames to determine the location of the detected objects 260a-260n (e.g., more analysis is performed by the processor 106). The analysis performed by the processor 122 and/or the processor 106 may be varied according to the design criteria of a particular implementation.

In some embodiments, the processor 122 may be implemented as a local processor for the camera device 100" and the processor 106" may be implemented as an external processor (e.g., a processor on a server and/or a server farm storing the database 220'). The processor 122 may be configured to combine the signal VIDEO and the signal STATUS for storage in the memory 108 (e.g., embed the status information in the video file as a text track, control channel, RTP stream, etc.). The camera device 100" may be configured to transmit the signal VIDEO with embedded status information to the server 220. The external processor 106" may be configured to perform the detection of the objects 260a-260n, a classification of the objects 260a-260n, the determination of the absolute coordinates of the detected objects 260a-260n, the generation of the metadata information 226a-226n and/or comparisons with information from external sources (e.g., the signal MAP).

The interface 104 may receive data from one or more of the sensors 114. The signal STATUS may be generated in response to the data received from the sensors 114 at a time of generation of the signal VIDEO. In some embodiments, the interface 104 may receive data from the location module 124. In some embodiments, the interface 104 may receive data from the orientation module 126. In some embodiments, the interface 104 may receive data from the processor 106 and/or the communication device 110. The interface 104 may send data (e.g., instructions) from the processor 106 to connected devices via the communications device 110. For example, the interface 104 may be bi-directional.

In the example shown (e.g., in FIG. 1 and FIG. 2), information from the sensors 114 (e.g., the location module 124, the orientation module 126, etc.) may be received by the interface 104. In one example, where the camera device 100 is installed in the vehicle 50, the interface 104 may be implemented as an electronic bus (e.g., a controller area network (CAN) bus) and the sensors 114 may be part of the vehicle 50. In another example, the interface 104 may be implemented as an Ethernet interface. In yet another example, the interface 104 may be implemented as an electronic device (e.g., a chip) with a CAN bus controller. In some embodiments, the sensors 114 may connect directly to the processor 106 (e.g., the processor 106 may implement a CAN bus controller for compatibility, the processor 106 may implement a serial peripheral interface (SPI), the processor 106 may implement another interface, etc.). In some embodiments, the sensors 114 may connect to the memory 108.

The processor 106 may be configured to execute computer readable code and/or process information. The processor 106 may be configured to receive input and/or present output to the memory 108. The processor 106 may be configured to present and/or receive other signals (not shown). The number and/or types of inputs and/or outputs of the processor 106 may be varied according to the design criteria of a particular implementation.

In some embodiments, the processor 106 may receive the signal VIDEO from the capture device 102 and detect the objects 260a-260n in the video frame. In some embodiments, the processor 122 may be configured to detect the objects 260a-260n and the processor 106 may receive the location (or coordinates) of detected objects 260a-260n in the video frame 250 from the capture device 102'. In some embodiments, the processor 106 may be configured to analyze the video frame 250 (e.g., the signal VIDEO). The processor 106 may be configured to detect a location and/or position of the detected objects 260a-260n in the video frame 250. The processor 106 may determine a distance of the detected objects 260a-260n from the camera (e.g., the lens 112) based on information from the signal STATUS. In some embodiments, the processor 106 may receive the location (or coordinates) of the detected objects 260a-260n from the capture device 102' and distance of the detected objects 260a-260n from the sensors 114 through the interfaces 104. The information received by the processor 106 and/or the analysis performed by the processor 106 may be varied according to the design criteria of a particular implementation.

In some embodiments, the processor 106 may receive the location (or coordinates) of the detected objects 260a-260n through Vehicle to Vehicle (V2V) communication. For example, the communication device 110 may be configured to receive location information from the detected vehicle 260d. In some embodiments, the lanes 270a-270n may be determined based on the detected objects 260a-260n. For example, the lane marker 260b and/or the HOV lane indicator 260c may be used to determine the lanes 270a-270n.

In some embodiments, the processor 106 may be configured to classify the objects 260a-260n. In one example, the processor 106 may classify objects based on velocity (e.g., slowing down or speeding up). In another example, the processor 106 may classify objects as signs (e.g., construction signs, road closure signs, stop signs, speed reduction signs, etc.). In yet another example, the processor 106 may classify a condition of objects (e.g., a bumpy road, a vehicle that has been in an accident causing traffic slowdowns, flashing sirens, etc.). The types of object classifications and/or the response to various classifications of the objects 260a-260n may be varied according to the design criteria of a particular implementation.

Based on the distance and/or location of the detected objects 260a-260n in the video frame 250 (e.g., from the signal VIDEO), the processor 106 may determine the absolute location and/or the absolute coordinates of the detected objects 260a-260n. The absolute coordinates of the detected objects 260a-260n may be based on the signal VIDEO and/or the signal STATUS. The processor 106 may generate the signal METADATA in response to the determined absolute position of the detected objects 260a-260n.

The signal METADATA may be implemented to provide map data (e.g., lane-specific information) corresponding to the video file 224. For example, the signal METADATA may be stored in the database server 220. In another example, the signal METADATA may be stored in the memory 108. Generally, the signal METADATA is searchable. Generally, the signal METADATA may correspond to a location of the detected objects 260a-260n. In some embodiments, the signal METADATA may provide contextual information about the objects 260a-260n and/or the lanes 270a-270n (e.g., classification information such as a size of the objects 260a-260n, OCR data from signs, speed of the objects 260a-260n, etc.).

The utilization of the data stored in the signal METADATA and/or the metadata information 226a-226n may be varied according to the design criteria of a particular implementation. In some embodiments, the signal METADATA may be presented to the communication device 110 and the communication device 110 may pass the signal METADATA to an external network and/or external storage (e.g., the network 210). In some embodiments, the signal METADATA may be presented directly to the storage 122 by the processor 106 (or the processor 106").

The processor 106 and/or the processor 122 may be implemented as an application specific integrated circuit (e.g., ASIC) or a system-on-a-chip (e.g., SOC). The processor 106 and/or the processor 122 may be configured to determine a current size of the detected objects 260a-260n (e.g., an object having a reference size). The processor 106 and/or the processor 122 may detect one or more of the detected objects 260a-260n in each video frame. The processor 106 and/or the processor 122 may determine a number of pixels (e.g., a width, a height and/or a depth) comprising the detected objects 260a-260n in the video frame 250. Based on the number of pixels of each of the detected objects 260a-260n in the video frame, the processor 106 and/or the processor 122 may estimate a distance of the detected objects 260a-260n from the lens 112. Whether the detection of the objects 260a-260n is performed by the processor 106 and/or the processor 122 may be varied according to the design criteria of a particular implementation.

The memory 108 may store data. The memory 108 may be implemented as a cache, flash memory, DRAM memory, etc. The type and/or size of the memory 108 may be varied according to the design criteria of a particular implementation. The data stored in the memory 108 may correspond to the detected objects 260a-260n, reference objects, the lanes 270a-270n, the video file 224 and/or the metadata information 226a-226n. For example, the memory 108 may store a reference size (e.g., the number of pixels of an object of known size in a video frame at a known distance) of the objects 260a-260n. The reference size stored in the memory 108 may be used to compare the current size of the detected objects 260a-260n in a current video frame. The comparison of the size of the detected objects 260a-260n in the current video frame and the reference size may be used to estimate a distance of the objects 260a-260n from the lens 112.

The memory 108 may store the pre-determined location of the camera device 100 and/or a pre-determined field of view of the camera device 100 (e.g., when the camera device 100 is implemented as a fixed view camera such as on a street lamp or a stop light providing an overhead view of a road). For example, the status information of the camera device 100 may be updated by over-writing the status information stored in the memory 108.

The communication device 110 may send and/or receive data to/from the interface 104. In some embodiments, when the camera device 100 is implemented as a vehicle camera, the communication device 110 may be the OBD of the vehicle. In some embodiments, the communication device 110 may be implemented as a satellite (e.g., a satellite connection to a proprietary system). In one example, the communication device 110 may be a hard-wired data port (e.g., a USB port, a mini-USB port, a USB-C connector, HDMI port, an Ethernet port, a DisplayPort interface, a Lightning port, etc.).

In another example, the communication device 110 may be a wireless data interface (e.g., Wi-Fi, Bluetooth, ZigBee, cellular, etc.). For example, the communication device 110 may be configured to communicate with the network 210. For example, the communication device 110 may be configured to transmit the signal METADATA. In another example, the communication device 110 may be configured to transmit the signals VIDEO and/or STATUS. In some embodiments, the communication device 110 may be configured to communicate with other vehicles (e.g., V2V communication).

The communication device 110 may be configured to send/receive particular formats of data. For example, the signals VIDEO, STATUS, METADATA and/or ROAD may be formatted to be compatible with an application program interface (API) of the server 220 and/or data from the signal MAP. The format of the message and/or additional information which may be uploaded by the camera device 100 to the server 220 may be communicated based on the method described in U.S. application Ser. No. 14/179,715, filed Feb. 13, 2014, which is hereby incorporated by reference in its entirety.

The lens 112 (e.g., a camera lens) may be directed to provide a targeted view from a vehicle. In one example, the lens 112 may be mounted on a dashboard of the vehicle 50. In another example, the lens 112 may be externally mounted to the vehicle 50 (e.g., a roof camera, a camera attached to side view mirrors, a rear-view camera, etc.). The lens 112 may be aimed to capture environmental data (e.g., light). The lens 112 may be configured to capture and/or focus the light for the capture device 102. Generally, the sensor 120 is located behind the lens 112. Based on the captured light from the lens 112, the capture device 102 may generate a bitstream and/or video data.

The sensors 114 may be configured to determine a location and/or orientation of the camera device 100. The number and/or types of data used to determine the location and/or orientation of the camera device 100 may be varied according to the design criteria of a particular implementation. In one example, the location module 124 may be used to determine an absolute location of the camera device 100. In another example, the orientation module 126 may be used to determine an orientation of the camera device 100. Generally, information from the sensors 114 may be an insufficient proxy for the absolute location and/or absolute coordinates of the detected objects 260a-260n. For example, the information from the sensors 114 may not provide accuracy sufficient for lane-specific information. Data from the sensors 114 may be presented to the processor 106 as the signal STATUS. In some embodiments, the data from the sensors 114 may be part of the metadata information 226a-226n.

The sensors 114 (e.g., the location module 124, the orientation module 126 and/or the other types of sensors) may be configured to determine an absolute location and/or an azimuth orientation of the camera device 100. The absolute location and/or the azimuth orientation of the camera device 100 may be added to the relative location of the detected objects 260a-260n to determine an absolute location (e.g., coordinates) of the detected objects 260a-260n. The absolute location of the objects 260a-260n may provide information to determine lane-specific information (e.g., road conditions).

The signal STATUS may provide location information and/or orientation information for the camera device 100 (e.g., the status information). The location information may be determined by the location module 124. For example, the location module 124 may be implemented as a GPS sensor. The orientation information may be determined by the orientation module 126. For example, the orientation module 126 may be implemented as a magnetometer, an accelerometer and/or a gyroscope.

The types of sensors used to implement the location module 124 and/or the orientation module 126 may be varied according to the design criteria of a particular implementation. In some embodiments, the signal STATUS may provide details about the camera device 100 (e.g., camera specifications, camera identity, a field of view, an azimuth orientation, date, time, etc.). In some embodiments, the signal STATUS may provide a speed of the vehicle 50, an occupancy of the vehicle 50, a route of the vehicle 50, a driving style of a driver of the vehicle 50 and/or location information for the vehicle 50.

Referring to FIG. 6, a diagram illustrating objects in a field of view of the apparatus 100 is shown. The vehicle 50 is shown in the lane 270b. The lens 112 (e.g., a front-mounted lens) is shown having a field of view 272. The field of view 272 may provide the targeted view from the vehicle 50. The objects 260b, 260c and 260d are shown in the field of view 272 (e.g., the objects 260b, 260c and/or 260d may be detected by the camera device 100). The status information and/or the video signal may comprise a value of the field of view 272 measured in degrees and/or radians (e.g., the measurement HFOV). In some embodiments, a similar value may be stored for a vertical measurement of the field of view 272 (e.g., a measurement VFOV).

The vehicle 50 is shown having coordinates LOC_X and LOC_Y. The coordinates LOC_X and/or LOC_Y may be determined based on information from the location module 124. For example, the coordinates LOC_X and LOC_Y may be GPS coordinates. The type of values and/or the source of the coordinates LOC_X and LOC_Y may be varied according to the design criteria of a particular implementation.

A line (e.g., the line A) is shown with respect to the lens 112. The line A may be an azimuth of the camera device 100. The azimuth value A may be determined based on an azimuth reference direction (e.g., north). The azimuth value A may be determined based on information from the orientation module 126. The absolute coordinates of the detected objects 260a-260n may be determined based on the determined azimuth orientation A. In the example, shown, for the front-mounted lens 112, the azimuth value A is the same direction as the direction of travel of the vehicle 50.

The detected objects 260a-260n may be compared to an object of known size (e.g., reference objects). The reference objects may have a size REAL_X and/or REAL_Y (e.g., a length and a width). In some embodiments, the reference objects may have a depth measurement. The reference sizes REAL_X and/or REAL_Y may be used to determine the absolute coordinates of the detected objects 260a-260n.

The camera device 100 and/or the processor 106 (or the external processor 106") may be configured to determine the absolute coordinates of the detected objects 260a-260n using information from the signal VIDEO. The camera device 100 may determine a reference size for various objects (e.g., the values REAL_X and/or REAL_Y stored in the memory 108). For example, the reference size for an object may be a number of pixels (e.g., a height, width and/or a depth).

The processor 106 may be configured to detect an object (e.g., one of the objects 260a-260n) and determine a location of the object in the video frame 250 (e.g., the dimensions M and N as shown in FIG. 5). The processor 106 may be configured to determine a number of pixels occupied by the detected object in the video frame 250 (e.g., a height, a width and/or a depth of the detected objects 260a-260n). For example, the size of the detected object 260f is shown as the dimensions X and Y in FIG. 5.

The processor 106 may determine a size of the frame 250 (e.g., a resolution in pixels, a number of pixels on a horizontal axis and/or a number of pixels on a vertical axis, etc.). For example, the size of the video frame 250 is shown as the values HSIZE and VSIZE in FIG. 5. In some embodiments, information used to determine the reference size (e.g., REAL_X and/or REAL_Y), the size of the object detected in the video frame (e.g., X and/or Y), the location of the object in the video frame (e.g., M and/or N) and/or the size of the frame (e.g., HSIZE and/or VSIZE) may be presented in the signal VIDEO.

The camera device 100 and/or the processor 106 (or the external processor 106") may be configured to determine the absolute coordinates of the detected objects 260a-260n using information from the signal STATUS. The orientation module 126 may be configured to determine an azimuth orientation A of the lens 112 (e.g., based on an azimuth reference direction). The lens 112 may be used to determine the field of view 272 of the camera device 100. For example, the field of view 272 may be a horizontal and vertical measurement and/or a measurement in degrees and/or radians (e.g., the measurement HFOV).

In some embodiments, the camera device 100 may account for a distortion caused by the lens 112. The location module 124 may be configured to determine location coordinates (e.g., LOC_X and/or LOC_Y) of the camera module 100 (e.g., a relative X and Y coordinates, GPS coordinates, absolute coordinates, etc.). In some embodiments, information used to determine the azimuth orientation (e.g., the azimuth orientation A), the location coordinates of the camera module 100 (e.g., LOC_X and/or LOC_Y), the field of view 272 (e.g., HFOV) and/or a lens distortion may be presented in the signal STATUS.

Based on the signal VIDEO and/or the signal STATUS, the camera device 100 and/or the processor 106 (or the external processor 106") may be configured to determine the absolute coordinates of the detected objects 260a-260n (e.g., generate the signal METADATA). For example, a calculation may be performed using the location of the object in the video frame 250 (e.g., the dimensions M and/or N), the size of the video frame 250 (e.g., the dimensions HSIZE and/or VSIZE) and/or the field of view 272 (e.g., the value HFOV and/or VFOV) to determine an angle of the detected objects 260a-260n relative to the azimuth plane A.

In another example, a calculation may be performed using the size of the reference object (e.g., REAL_X and/or REAL_Y), the number of pixels occupied by the object in the video frame (e.g., the dimension X and/or Y), the size of the video frame 250 (e.g., the dimension HSIZE and/or VSIZE) and/or the field of view 272 (e.g., the value HFOV) to determine the distance of the detected objects 260a-260n relative to the camera device 100 (or the lens 112).

In yet another example, a calculation based on the location coordinates of the camera device 100 (e.g., LOC_X and/or LOC_Y), the angle of the detected objects 260a-260n relative to the azimuth plane A and/or the distance of the detected objects 260a-260n relative to the camera device 100 (or the lens 112) may be used to determine the absolute coordinates of the center of the detected objects 260a-260n (e.g., the absolute location of the detected objects 260a-260n to be presented in the signal METADATA).

In some embodiments, only horizontal components of the measurements and/or dimensions may be used (e.g., M, X, HSIZE, HFOV and/or REAL_X) to determine absolute coordinates of one of the detected objects 260a-260n. In some embodiments, only vertical components and/or dimensions may be used (e.g., N, Y, VSIZE, VFOV and/or REAL_Y) to determine absolute coordinates of one of the detected objects 260a-260n. The measurements and/or dimensions used as variables and/or the equations used based on the measurements and/or dimensions of the detected objects 260a-260n, the lanes 270a-270n and/or the video frame 250 may be varied according to the design criteria of a particular implementation.

Figure 7:
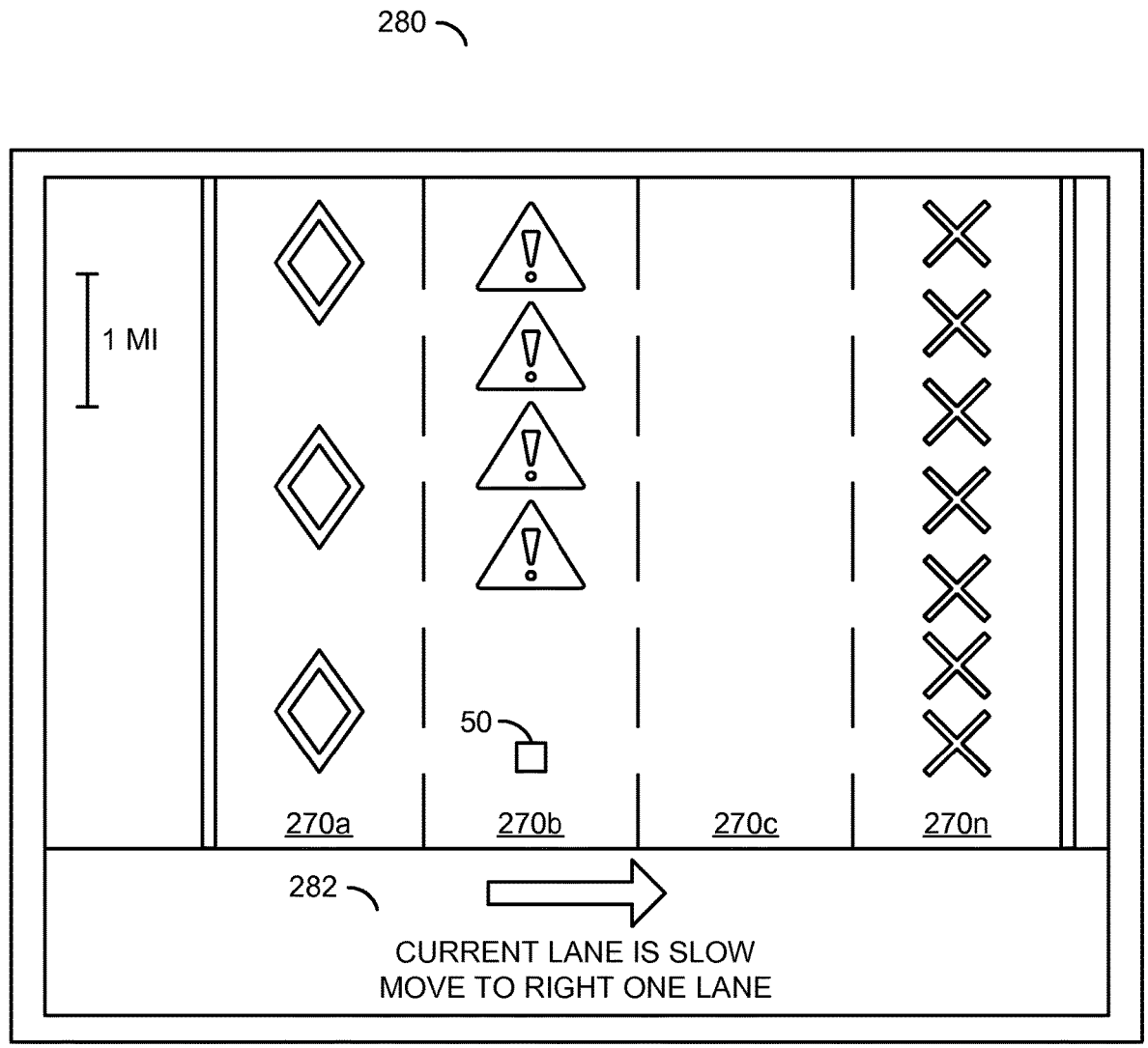
FIG. 7 is a diagram illustrating a map interface based on road conditions.

Referring to FIG. 7, a diagram illustrating a map interface 280 is shown. The map interface 280 may provide a suggestion 282 based on road conditions. For example, the suggestion 282 that the "current lane is slow", "move to right one lane" is shown. The interface 280 shows the automobile 50 in the lane 270b. The lane 270a is shown as a HOV lane (e.g., the lane is open, but the vehicle 50 may not be permitted to use the HOV lane 270a based on an occupancy of the vehicle 50 detected and stored as part of the status information). The lane 270b is shown as moving slowly ahead (e.g., congested traffic). The lane 270c is shown as clear. The lane 270n is shown blocked (or closed). Therefore, the suggestion 282 is to move one lane to the right.

The suggestion 282 may be implemented as an alphanumeric suggestion on a screen, or as a graphic, such as the arrow shown. A combination of an alphanumeric message and a graphic message may also be used. In another example, the suggestion 282 may be presented as an audio signal. In some embodiments, the vehicle 50 may be an autonomous and/or a semi-autonomous vehicle and the suggestion 282 may be performed automatically by the vehicle 50. The implementation of the suggestion 282 may be varied according to the design criteria of a particular implementation.

Figure 8:
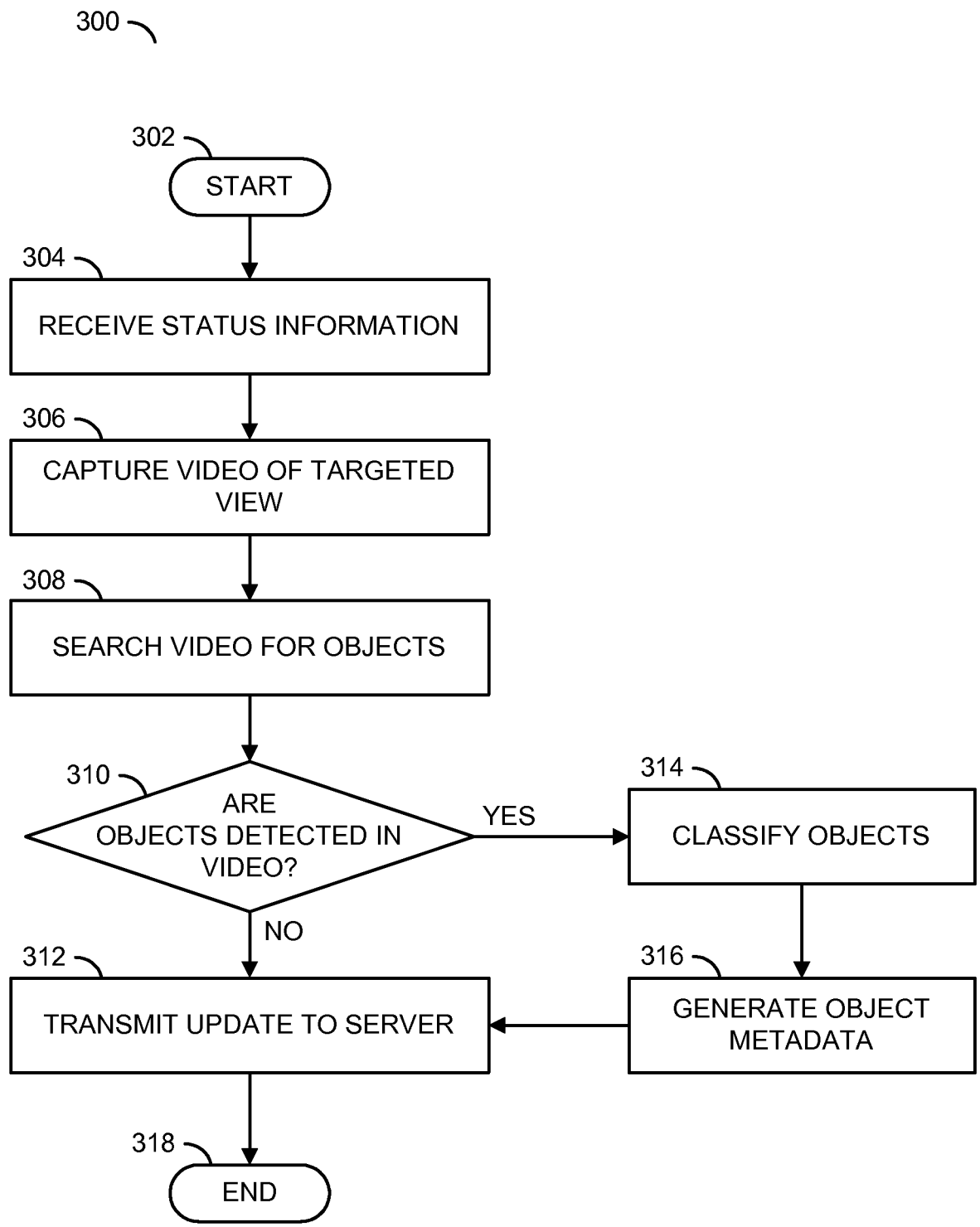
FIG. 8 is a flow diagram illustrating a method for classifying detected objects and generating metadata.

Referring to FIG. 8, a method (or process) 300 is shown. The method 300 may classify detected objects and generate metadata. The method 300 generally comprises a step (or state) 302, a step (or state) 304, a step (or state) 306, a step (or state) 308, a decision step (or state) 310, a step (or state) 312, a step (or state) 314, a step (or state) 316, and a step (or state) 318.

The step 302 may start the method 300. The step 304 may receive status information (e.g., the signal STATUS). The step 306 may capture video of a targeted view (e.g., the frame 250). The step 308 may search the video for the objects 260a-260n. The decision step 310 may determine if there are objects detected in the video. If not, the method 300 moves to the step 312. If the decision step 310 determines that objects are detected in the video, the method 300 moves to the step 314. The step 314 classifies the detected objects 260a-260n. Step 316 generates object metadata (e.g., the signal METADATA), then moves to the step 312. The step 312 transmits the updates to the server 220. Next, the method 300 moves to the end step 318.

Figure 9:
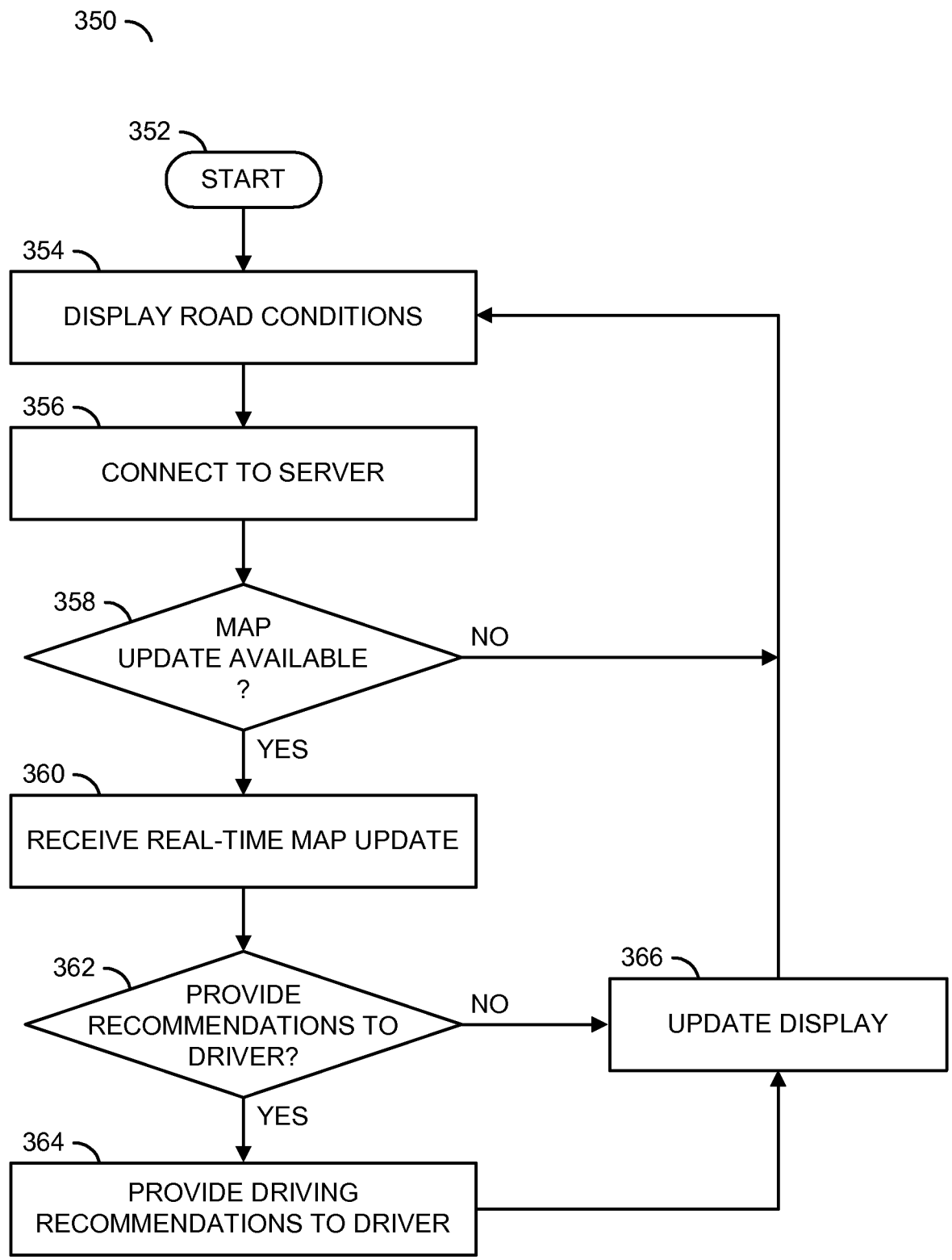
FIG. 9 is a flow diagram illustrating a method for providing driver recommendations based on real-time map data.

Referring to FIG. 9, a method (or process) 350 is shown. The method 350 may provide driver recommendations based on real-time map data. The method 350 generally comprises a step (or state) 352, a step (or state) 354, a step (or state) 356, a decision step (or state) 358, a step (or state) 360, a decision step (or state) 362, a step (or state) 364, and a step (or state) 366.

The step 352 may be a start step for the method 350. The step 354 may display road conditions. The step 356 may connect to the server 220. The decision step 358 may determine if a map update is available. If not, the method 350 may move back to the step 354. If the decision step 358 determines that a map update is available, the method 350 may move to the step 360. The step 360 may receive real time map updates from the server 220. Next, the decision step 362 may determine whether recommendations are available to provide to the driver. If not, the method 350 may move to the step 366. If the decision step 362 does determine that recommendations are available to provide the driver, the method 350 may move to the step 364. The step 364 may provide (e.g., display, play back audio, etc.) driving recommendations to the driver. Next, the method 350 may move to the step 366, which may update the display. The method 350 may then move back to the step 354.

Figure 10:
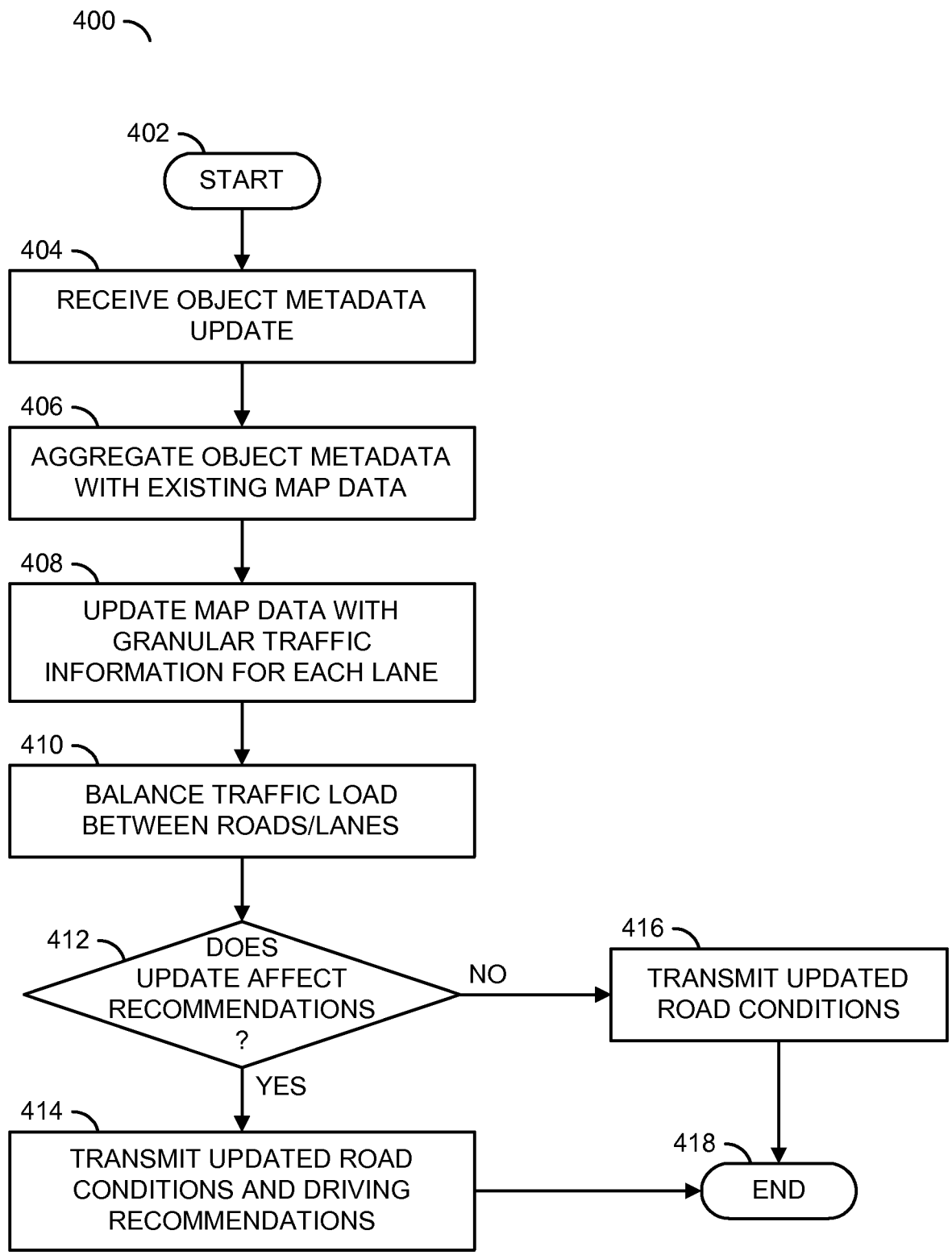
FIG. 10 is a flow diagram illustrating a method for aggregating metadata to provide granular traffic information for each lane.

Referring to FIG. 10, a method (or process) 400 is shown. The method 400 may aggregate metadata to provide granular traffic information for each lane. The method 400 generally comprises a step (or state) 402, a step (or state) 404, a step (or state) 406, a step (or state) 408, a step (or state)

410, a decision step (or state) 412, a step (or state) 414, a step (or state) 416, and a step (or state) 418.

The step 402 may be a start step for the method 400. Next, the step 404 may receive an object metadata update (e.g., at the server 220). Next, the step 406 may aggregate object metadata with existing map data (e.g., received from the signal MAP). Next, the step 408 may update the map data with granular traffic information for each of the lanes 270a-270n. Next, the step 410 balances a traffic load between the road/lanes. Next, the decision step 412 determines whether the update affects the recommendations. If so, the method 400 moves to the step 414. If not, the method 400 moves to the step 416. The step 414 transmits an updated road condition and/or driving recommendation to the driver. The step 416 transmits updated road conditions. The method 400 then ends at the step 418.

In some embodiments, the per-lane speed information may be used to implement road-balancing for traffic. For example, the server 220 may be configured to aggregate the lane-specific information received from the apparatus 100a-100n. The lane-specific information recommendations may be provided to drivers and/or vehicles (e.g., autonomous vehicles). For example, a driver may be provided with a recommendation to exit a freeway in response to a detected traffic jam.

Figure 11:
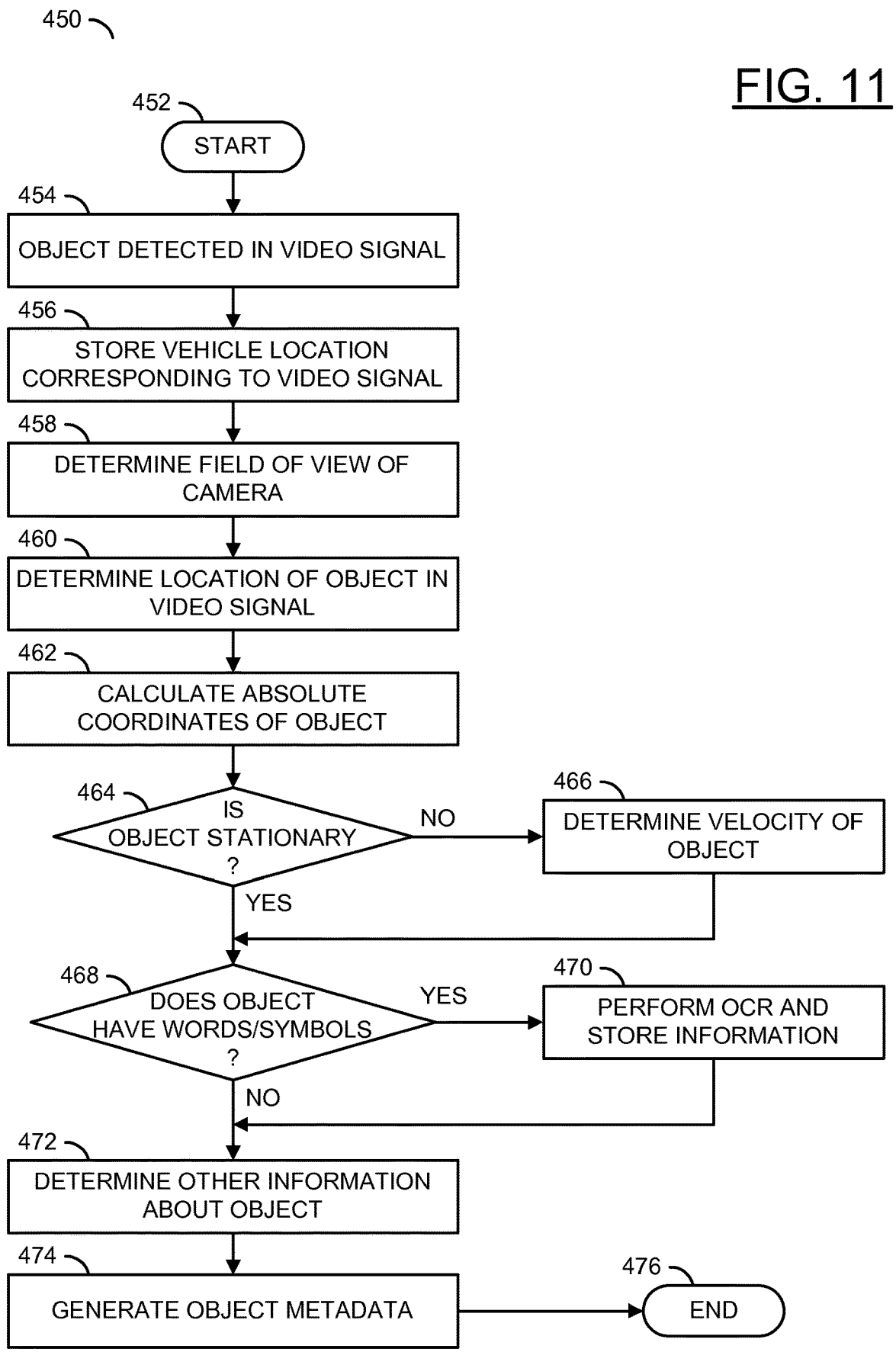
FIG. 11 is a flow diagram illustrating a method for determining metadata based on detected objects in a video frame.

Referring to FIG. 11, a method (or process) 450 is shown. The method 450 may determine metadata based on detected objects in a video frame. The method 450 generally comprises a step (or state) 452, a step (or state) 454, a step (or state) 456, a step (or state) 458, a step (or state) 460, a step (or state) 462, a decision step (or state) 464, a step (or state) 466, a decision step (or state) 468, a step (or state) 470, a step (or state) 472, a step (or state) 474, and a step (or state) 476.

The step 452 may be a start step for the method 450. The step 454 may detect the objects 260a-260n in the video signal (e.g., the signal VIDEO). The step 456 may store vehicle location information corresponding to the video signal (e.g., based on the information from the sensors 114, such as GPS information, the coordinates LOC_X and LOC_Y, etc.). The state 458 may determine a field of view of the camera 100 (e.g., the field of view 272). The step 460 may determine the location of an object in the video signal (e.g., the dimensions M and N). The step 462 may calculate absolute coordinates of the object. Next, the method 450 may move to the decision step 464.

The decision step 464 may determine if the object is stationary. If not, the step 466 may determine a velocity of the object. Next, the method 450 may move to the to the decision step 468. If the decision step 464 determines that the object is stationary, the method 450 may move to the decision step 468. The decision step 468 may determine whether the object includes words or symbols. If so, the method 450 may move to the step 470. The step 470 may perform optical character recognition (OCR) and store the information. Next, the method 450 may move to the step 472. If the decision step 468 determines that the object does not have words or symbols, the method 450 may move to the step 472. The step 472 may determine other information about the object. The step 474 may generate object metadata (e.g., the signal METADATA). Next, the step 476 may end the method 450.

The sensor circuit 114 may include a GPS sensor to determine the approximate location of a vehicle on the road. GPS sensors typically used in automotive applications have a ±10 ft accuracy. Such accuracy is not sufficient to localize a vehicle in a specific one of the lanes 270a-270n. A GPS sensor is suitable to get a rough location and direction on a road. The frame (or image) 250 from the front-facing capture device 102 of a camera may then be analyzed to identify the lanes 270a-270n and/or the objects 260a-260n (e.g., vehicles, road infrastructure elements, etc.) to determine one or more conditions of the lanes 270a-270n.

The particular number of lanes 270a-270n on a particular road may be determined by analyzing the frame 250. Alternatively, the number of lanes 270a-270n on the road may be retrieved as part of the static map information stored on the server 220 (e.g., in the storage 122). In a system with a number of devices 100a-100n installed in a number of vehicles, one of the vehicles may be considered an "ego" vehicle (e.g., a vehicle of primary concern such as the vehicle 50). The particular lane 270a-270n of the ego vehicle 50 may be determined from the frame 250. Alternatively, a particular one of the lanes 270a-270n of the ego vehicle 50 may be determined by an ultra-sensitive GPS (e.g., Glonass, etc.).

The server 220 may determine an estimated average speed of each of the vehicles containing an apparatus 100a-100n. The particular lane 270a-270n of each of the vehicles may also be determined. Lane information may be received from other vehicles through V2V communication. The server 220 may determine which lanes are closed by analyzing information in the frame 250 (e.g., empty lanes, orange cones, or another specific combination of recognized objects). In one example, the processor 106 may perform some of the analysis and the server 220 may perform some of the analysis. Performing some of the analysis on the processor 106 may be faster than transmitting the signal METADATA to the server 220, then retrieving the signal ROAD_A.

Road exits and/or ramps that are closed may also be analyzed by the server 220 and/or the processor 106. For example, empty exits/ramps, orange cones, or another specific combination of recognized objects may be used to determine a closed ramp. High occupancy vehicle (HOV) usage may also be analyzed. For example, the server 220 (or the processor 106) may be used to recognize a rhombus lane-marking or the road-sign typically used to designate an HOV lane (e.g., the detected object 260c).

The speed of vehicles in each of the lanes 270a-270n may be determined by a combination of calculations. The speed of the ego vehicle 50 may be received from GPS (e.g., the signal STATUS possibly received through the OBD port). A change in distance between the ego vehicle 50 and other vehicles (e.g., the object 260a, 260d and/or 260e) recognized in the frame 250 (e.g., vehicles traveling in other lanes) may be determined by the size and/or relative location of the recognized vehicle in the video frame 250. One or more V2V signals may be transmitted to/from other vehicles, such as vehicles traveling in other lanes 270a-270n. Recognition of empty lanes, or lanes delineated by orange cones, may be used to indicate lane closure and/or exit/ramp closures due to accidents, collisions and/or roadwork.

The server 220 may be implemented as a back-end/server-side system to collect the per-lane occupancy and/or travel speed information from a multitude of cars each having one of the apparatus 100a-100n. The server 220 may generate data that may be sent to the apparatus 100a-100n through the signals ROAD_A-ROAD_N. For example, the server 220 may generate the map 280 to illustrate graphically granular traffic information that may reflect the speed and/or congestion in each of the lanes 270a-270n. The route recommendation 282 may be generated using a number of conditions and/or criteria.

For example, the route recommendation 282 may reflect a travel time estimation under optimal routes (or typical routes) based on which specific lanes 270a-270n the ego vehicle 50 may be traveling in. The route recommendation 282 may also reflect HOV lane eligibility. HOV eligibility may be set by the user manually, or recognized automatically by a combination of OBD port information, a cabin-monitoring camera configured to count the number of people in the cabin or other automatic calculations. Exit/merge lane usage may be configured depending on the route. The route recommendation may be calculated to accommodate driving styles (e.g., aggressive/passive, etc.).

The route recommendation 282 may suggest particular lane changes within a given road. The route recommendation 282 may choose an optimal route based on all the available information (e.g., HOV eligibility, a driving style of a driver, a determined aggression level of a driver, etc.). The server 220 may calculate a recommendation that balances the traffic load between the lanes 270a-270n and/or may be configured to accommodate the overall road throughput to lower average travel times for all road users. The server 220 may provide updates to the routes on-the-fly as real-time lane speed/occupancy information changes through the signals ROAD_A-ROAD_N. The server 220 may provide updates that recommend speed changes if the vehicle 50 travels in a lane that is expected to slow down (e.g., to avoid sudden or last minute braking).

A number of the apparatus 100a-100n may be implemented as an autonomous (or semi-autonomous) driving mechanism that utilizes the techniques discussed. A number of the apparatus 100a-100n may be implemented as part of an autonomous or semi-autonomous vehicle that utilizes the techniques discussed.

Generally, when a GPS (e.g., the location module 124) recommends a route to a driver all routes may be scanned and a fastest option may be selected. The fastest option may be based on data collected from numerous drivers (e.g., millions) that previously traveled the route. For example, if a group of drivers are traveling a road with the same destination a traditional GPS may recommend the same fastest route to the entire group of drivers. Recommending the same route to all the drivers may lead to traffic congestion.

The camera device 100 may implement a load-balanced system based on responses from the server 220 (e.g., the signal ROAD). For example, the server 220 may recommend the fastest route to some of a group of drivers, predict how the recommendations affect the traffic load in the future and, in response, recommend a different route to other drivers (e.g. the fastest route to 5 drivers and the second fastest to another 5 drivers). The load-balanced system may be implemented to keep the roads evenly balanced. Without load-balancing traffic swings may occur. A traffic swing may be a situation where everyone travels particular route because the route is the fastest route, causing the fastest route to suddenly stop (e.g., become congested), then everyone travels to a next fastest route.

The camera device 100 may be configured to implement load-balancing on a lane-specific granularity. Traditional load-balanced systems do not have data on lanes. Lane-specific load-balancing may improve traffic conditions (e.g., increase traffic flow). For example, with lane information, the driver may receive more precise driving time estimations for each route, which may improve traffic balancing. In another example, with lane information, the sever 220 may be configured to balance traffic loads between exit lanes and lanes going straight inside the same road (e.g., to make sure all lanes are equally occupied and increase throughput).

The camera device 100 and/or the server 220 may implement a crowd-sourced system. For example, each vehicle equipped with the camera device 100 may provide camera-tagged metadata based on captured video signals and/or status information from the vehicle 50. The camera device 100 may be configured to provide a precise source of granular (e.g., lane-specific) information. The precise lane-specific information may be used to improve navigation and/or improve traffic throughput.

The functions performed by the diagrams of FIGS. 8-11 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a capture circuit configured to generate a video signal based on a targeted view from a vehicle;
   an interface circuit configured to receive status information about said vehicle from (i) one or more sensors on said vehicle, (ii) a Global Positioning System sensor and (iii) map data received from a navigation database; and
   a processor circuit, connected to said interface circuit, configured to
     (A) receive (i) said video signal from said capture circuit and (ii) said status information from said interface circuit,
     (B) detect objects in said video signal and
     (C) generate metadata comprising lane-specific information in response to (i) a classification of said objects in said video signal and (ii) said status information,
   wherein
     (i) said metadata is used to overlay said lane-specific information on said map data received from said navigation database to reflect traffic congestion in each of two or more lanes of a road,
     (ii) said classification of said objects comprises a calculation of relative coordinates corresponding to each of said detected objects based on a location of each of said detected objects in a video frame of said video signal added to an absolute location of said capture circuit based on said status information and
     (iii) said apparatus is used to inform a driver of said vehicle to use a particular one of said lanes with the least amount of congestion.

2. The apparatus according to claim 1, further configured to upload said metadata to a server.

3. The apparatus according to claim 2, wherein said server is configured to aggregate said metadata from a plurality of vehicles using a respective one of a plurality of said apparatus with said map data to determine said traffic congestion for each of said lanes of said road.

4. The apparatus according to claim 2, wherein said server is configured to enhance said map data with granular traffic information for each lane based on said metadata.

5. The apparatus according to claim 4, wherein said server is further configured to generate real-time updates to said map data based on said metadata received from said apparatus.

6. The apparatus according to claim 2, wherein said server is configured to determine a route recommendation for said vehicle based on said traffic congestion.

7. The apparatus according to claim 2, wherein said server is configured to provide information to said driver of said vehicle corresponding to at least one of (a) lane changes and (b) speed changes based on said traffic congestion in each of said lanes.

8. The apparatus according to claim 3, wherein said server is configured to balance traffic loads between at least one of (a) lanes and (b) routes based on (i) a road throughput calculated by said server using said metadata from said plurality of vehicles and (ii) said traffic congestion in each of said lanes.

9. The apparatus according to claim 1, wherein said apparatus further comprises a communications module configured to (i) receive said metadata from said processor and (ii) transmit said metadata to a network external to said apparatus.

10. The apparatus according to claim 9, wherein said communications module is further configured to perform vehicle to vehicle communications.

11. The apparatus according to claim 9, wherein said communications module is configured to perform at least one of Wi-Fi communications and cellular communications.

12. The apparatus according to claim 1, wherein said traffic congestion includes at least one of an average speed of traffic in each lane, lane closures, exit ramp closures, empty lanes, traffic accidents, on-ramp closures, per lane occupancy and high occupancy vehicle lanes.

13. The apparatus according to claim 1, wherein said objects comprise at least one of lane markers, other vehicles, road infrastructure, signs, road cones and barriers.

14. The apparatus according to claim 1, wherein said apparatus is further configured to determine a current lane occupied by said vehicle based on at least one of (a) said objects detected by said processor and (b) said status information.

15. The apparatus according to claim 1, wherein said status information comprises at least one of a speed of said vehicle, an occupancy of said vehicle, a route of said vehicle, a driving style of said driver of said vehicle and location information for said vehicle.

16. The apparatus according to claim 1, wherein (A) said metadata comprises at least one of a size of said objects, said location of said objects in said video frame, a type of said objects, a speed of said objects, said relative coordinates of said objects and a condition of said objects and (B) calculation of said relative coordinates is further based on a field of view of said apparatus.

17. The apparatus according to claim 1, wherein said status information comprises an orientation of said apparatus received from a magnetometer.

18. The apparatus according to claim 1, wherein (i) said apparatus is implemented as a portion of a driving mechanism for said vehicle and (ii) said vehicle is at least one of (a) an autonomous vehicle and (b) a semi-autonomous vehicle.

19. The apparatus according to claim 1, wherein (i) said vehicle is at least one of (a) an autonomous vehicle and (b) a semi-autonomous vehicle and (ii) said vehicle utilizes said apparatus.

20. The apparatus according to claim 1, wherein (i) said map data provides a first estimate of traffic congestion along said road and (ii) said classification of said objects in said video is used to provide a second estimate of traffic congestion about each of said two or more lanes of said road.

* * * * *